(12) United States Patent
Jordan et al.

(10) Patent No.: US 6,724,751 B1
(45) Date of Patent: Apr. 20, 2004

(54) DISTRIBUTED VOICE PROCESSING SYSTEM

(75) Inventors: Robert Michael Jordan, Winchester (GB); Andrew Ritchie, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,728

(22) Filed: Mar. 24, 2000

Related U.S. Application Data

(63) Continuation of application No. 08/850,258, filed on May 5, 1997.

(30) Foreign Application Priority Data

Dec. 21, 1996 (GB) .............................................. 9626669

(51) Int. Cl.$^7$ .............................................. H04L 12/66
(52) U.S. Cl. ...................... 370/352; 370/357; 370/389; 370/395; 370/442
(58) Field of Search ............................. 370/235, 238.1, 370/254, 259, 260, 261, 351, 352, 357, 360, 389, 396, 397, 399, 400, 401, 402, 404, 431, 432, 437, 442, 451, 458, 395.1, 395, 392, 395.6, 466, 362, 364; 379/67, 89; 455/422.1, 460

(56) References Cited

U.S. PATENT DOCUMENTS 5,029,199 A * 7/1991 Jones et al. ............... 379/88.26
5,301,226 A * 4/1994 Olson et al. .............. 379/88.18

(List continued on next page.)

FOREIGN PATENT DOCUMENTS

EP 0550274 * 7/1973
WO WO90/04298 * 4/1990

OTHER PUBLICATIONS

"Conversant 1 voice system: Architecture and Applications", R. Perdue and E. Rissanen, AT&T Technical Journal, Sep./Oct. 1986, vol. 65/5, pp. 34–47.*

"The Surging CTI Tide" Bob Emmerson and David Greetham, Byte magazine, Nov. 1996.* http://www.dialogic.com/products/d_sheets/2335WE-B.htm.*

"Spawn of NT and ATM: The Un–PBX" Ed Margulies, Computer Telephony, Nov. 1996, pp. 72–84.*

*Primary Examiner*—Wellington Chin
*Assistant Examiner*—Jamal A. Fox
(74) *Attorney, Agent, or Firm*—Jerry W. Herndon

(57) ABSTRACT

A distributed voice processing system comprises two or more voice processing machines 50A, 50B, connected by an isochronous network. In the preferred embodiment this network comprises an ATM switch 80 and appropriate ATM links 82A, 82B. Each of the voice processing machines includes telephone line interface units 52 connected to the telephone network 5 via respective telephony channels 15, a TDM bus 54, voice resources 55 (such as voice recognition, voice response functionality, etc), and an ATM adapter 58 to allow communications over the ATM network. In operation, a call may be received at the line interface unit at a first voice processing machine, and placed onto a TDM bus at that machine. The call is then taken off the TDM bus by the ATM adapter, and routed over the ATM network to the ATM adapter at a second machine, which places the call on the TDM bus at this second machine. The call is then processed by a voice resource at this second machine, which has access to the TDM bus, thereby allowing a call to be handled by a line interface unit at a first voice processing machine and a voice resource at a second voice processing machine.

21 Claims, 5 Drawing Sheets

U.S. PATENT DOCUMENTS

| | | | |
|---|---|---|---|
| 5,394,460 A | * | 2/1995 | Olson et al. .............. 379/88.26 |
| 5,408,469 A | * | 4/1995 | Opher et al. ................. 370/399 |
| 5,526,344 A | * | 6/1996 | Diaz et al. ................... 370/364 |
| 5,526,349 A | * | 6/1996 | Diaz et al. ................... 370/392 |
| 5,541,917 A | * | 7/1996 | Farris ........................... 370/352 |
| 5,546,392 A | * | 8/1996 | Boal et al. ................... 370/458 |
| 5,600,643 A | * | 2/1997 | Robrock, II ................. 370/399 |
| 5,680,396 A | * | 10/1997 | Moritomo et al. ........... 370/392 |
| 5,719,858 A | * | 2/1998 | Moore .......................... 370/347 |
| 5,761,192 A | * | 6/1998 | Hummel ....................... 370/254 |
| 5,809,021 A | * | 9/1998 | Diaz et al. ................... 370/364 |
| 5,831,979 A | * | 11/1998 | Byers ........................... 370/360 |
| 5,841,771 A | * | 11/1998 | Irwin et al. .................. 370/360 |
| 5,864,537 A | * | 1/1999 | Hijikata et al. .............. 370/235 |
| 5,930,253 A | * | 7/1999 | Brueckheimer et al. ..................... 370/395.61 |
| 6,163,535 A | * | 12/2000 | Jordan et al. ................ 370/352 |

* cited by examiner

DISTRIBUTED VOICE PROCESSING SYSTEM

This is a continuation of application Ser. No. 08/850,258, filed May 5, 1997.

BACKGROUND OF THE INVENTION

The invention relates to a distributed voice processing system, and more particularly to such a system comprising at least first and second components connected by an isochronous communications link.

In recent years telephone networks have started to provide increasingly sophisticated services, and this trend is likely to continue, for example with speech dialling (where the caller simply speaks in the name of a person who it is desired to call), and so on. In order to implement such advanced services, so-called Intelligent Peripherals (IPs) are required to provide the extra capability over and above the routing and billing functions of a traditional telephone network. These IPs are normally located at Service Nodes (SN) within the network. IPs can also be used at private installations, especially those which handle a large volume of incoming and/or outgoing calls.

IPs are used to provide enhanced services such as voice services, voice response, voice mail, fax mail, and other applications. Most IPs are based on voice processing units (or voice response units), and are usually restricted in capacity to handling typically between 100 and 200 channels. However, it is often required to have Service Nodes that support hundreds or even thousands of telephony channels, so that multiple voice processing units must be used. This requires an architecture suitable for combining the multiple voice processing units into a service node.

An example of a system having multiple voice processing units is disclosed in U.S. Pat. No. 5,029,199, which describes a voice messaging system for use in the telephone network or at a large private installation. This system includes multiple voice processing units, a digital switch and a master control unit. The voice processing units have a digital T1 trunk connection to the switch for telephony channels (or an E1 connection where appropriate), whilst the voice processing units, digital switch, and master control unit are also connected together via a data control bus, such as an Ethernet. Notification of an incoming call initially arrives at the master control unit, which selects an appropriate voice processing unit to handle the call (based for example on current loading of the units, or the called or calling number), and sends an appropriate instruction to the switch. Then, when the incoming call itself arrives at the switch, it is routed to the selected voice processing unit. If necessary, the selected voice processing unit can retrieve the appropriate greeting or a stored message belonging to the caller from another voice processing unit over the data control bus.

A somewhat similar system is described in U.S. Pat. No. 5,394,460, in which multiple voice processing systems are connected by a Fibre Distributed Data Interface (FDDI). This system does not have a master control unit—each voice processing unit can handle calls in a suitable manner for any subscriber to the system, including retrieving, where necessary, a subscriber greeting and messages from the other voice processing unit(s) over the FDDI link. "Conversant 1 voice system: Architecture and Applications", by R Perdue and E Rissanen, in AT&T Technical Journal, September/October 1986, Vol 65/5, p34–47 describes a system where multiple subsystems provide eg voice response, isolated word recognition etc, are connected to a switch so that they can be shared between calls. A line interface unit is interposed between the switch and the telephone network. The subsystems and line interface unit are also attached via a general-purpose interface bus, which runs an application to control overall system operation, invoking the facilities of subsystems when necessary. This system effectively operates as a single, multi-function IP, and so is limited in its overall call processing capabilities.

An example of the use of an IP installation is illustrated in FIG. 1, which acts as a Service Node 10 within the telephone network. Thus calls are routed to the service node from within the telephone network 5 via multiple trunk lines 15, such as T1 digital trunk lines, which each carry twenty-four individual telephony channels. The incoming trunk lines arrive at a switch 20, which has a set of line interface (LI) units 22, such that each incoming trunk line is terminated by a corresponding LI unit. Usually this switch is a programmable, time-division multiplex (TDM) switch, which allows host-controlled routing of incoming calls to a selected voice processing unit, and host-controlled bridging between calls. The line interface units can be used to perform a variety of functions, such as analog to digital conversion (not necessary if T1 trunks are used), signalling, DTMF detection, and so on.

The back end of the switch is connected to multiple voice processing units 50A, 50B via a further set of digital trunk lines 45, which typically are also T1 trunks. A pair of line interface units are provided at opposite ends of each internal digital trunk line 45, the first line interface unit 24 being at the back end of the switch, and the second line interface unit 52 being attached to the voice processing unit to which the trunk is connected. The voice processing units 50 contain multiple voice resources 55, which can be used for example to play voice prompts, perform voice recognition, FAX-back etc, depending on the desired service. The line interface units 52 are connected to the voice resources 55 via a TDM bus 54. Often this connection is hardwired so that calls on a particular line interface unit are always directed to the same voice resource. Overall control of a call at the voice processing unit is provided by one or more applications 60 running on the 15 voice processing unit. The application determines, for example, which voice prompts to play, and in which order.

The switch routes the incoming call from trunk line to an appropriate voice processing unit under the control of a Call Manager 30 (also termed the host). The Call Manager is connected to the switch 20 by a first control interface 35 (typically provided either by a LAN connection or some switch-dependent hardware link), and to the voice processing units 50 by a second control interface 36 (typically a LAN connection). The Call Manager uses the second control interface to communicate with the voice processing units 50, via a call manager component 62 on each voice processing unit.

The routing decision of the Call Manager can be based on various criteria. For example, the caller may have personal information (eg a voice mail message or greeting) stored on a particular voice processing unit, or may require a special service (eg use of specialised voice recognition hardware). This routing is often performed based on Automatic Number Identification and/or Dialled Number Identification Service (ANI/DNIS) information, the former representing the calling number, the latter the called number. This ANI/DNIS information (if available) is supplied to the Call Manager from the telephone network via switch 20 over control interface link 35. Other information might also be employed to establish the routing, such as time of day, and/or current loading of the different end units. This latter information can be obtained by the Call Manager directly from the different call manager components on their respective voice processing units. The second control interface 36 also allows the Call Manager to pass information (such as ANI/DNIS) via the call manager component 62 to the application 60 on the voice processing unit which is to receive a particular call, so that this information is available if desired in order to process the call.

Once the Call Manager has instructed the switch of a suitable destination for the incoming call, the switch effects this routing by completing the appropriate internal connections. This involves routing the call from a channel on an incoming trunk 15 through to an available channel on an appropriate one of the internal trunk lines 45 for connection with a desired voice processing unit 50. The call is then passed through the relevant line interface unit 52 and TDM bus 54, before being handled by the appropriate voice resource 55 under the control of application 60.

It will be appreciated that the Call Manager of FIG. 1 performs an analogous function to the master control unit in the above-mentioned U.S. Pat. No. 5,029,199, (the fact that the Call Manager is connected to the telephone network via the switch whereas the master control unit is connected directly to the network simply reflects the type of signalling supported by the network and the capabilities of the switch; the appropriate configuration will vary from one installation to another).

Aside from forwarding incoming calls to a selected voice processing unit, the Service Node 10 may be provided with additional capabilities. For example, calls may be bridged by connecting a first line coming into the switch from the telephone network with a second line going back out to the telephone network from the switch. This may be performed for example to provide some form of conferencing service, or for applications which provide a single number service, or a calling card service, where an incoming caller needs to be connected with a second, outbound, call. Furthermore, some applications running on the voice processing unit may be essentially outbound rather than inbound, as so far described; ie they produce outgoing calls from the Service Node through switch 20, out into telephony network 5.

Prior art systems, such as that illustrated in FIG. 1, suffer from the major disadvantage that they are expensive to implement, not least because of the need for a switch. Thus the entry cost of a typical switch is somewhere in the range from $50,000 to $100,000, and is unlikely to drop significantly in the future, firstly because such switches use proprietary architectures, and will never be manufactured in large volumes, and also because of the large amount of telephony line interface hardware which is required, both on the telephone network side for trunks 15, and also on the voice processing side for trunks 45. Yet a further set of telephony line interface hardware is then required for the voice processing systems themselves.

Furthermore, the prior art solution illustrated in FIG. 1 also provides only limited scalablity, since a single switch is often limited to around 2000 telephony channels (ie 1000 network connected telephony channels, since an equivalent number of channels are generally required on the voice processing side of the switch). It is of course possible to employ multiple switches, but this adds to the software complexity of the installation, resulting in greater development and maintenance costs.

A rather different approach to that of FIG. 1 is disclosed in WO 90/04298, which describes a telephony processing system having one or more T1 interface units, one or more signal processing units that can provide functions such voice response, text-to-speech, and so on, and a control processor. These components are linked together by a control bus (a multibus). The T1 interface units and the signal processing units are also linked together by a telephony bus. It is the responsibility of the control processor to send instructions over the multibus to ensure that an incoming call at a particular interface unit is placed onto the telephony bus, and then correctly extracted from the telephony bus by the appropriate signal processing unit. This arrangement obviates the need for a switch, but is essentially limited in size to a single machine.

Other systems which do not require a switch are described in "The Surging CTI Tide" by Bob Emmerson and David Greetham, in Byte magazine, Novermber 1996. This article discloses a PC-based call handling system, in which one card is used as a line interface card, one as a FAX card, one to provide voice response functionality, and so on. These cards are linked together by a telephony time division multiplex bus (TDM), in addition to being plugged into the conventional PC ISA or PCI bus. Most commercial telephony TDM buses conform to one of two standards: either Multi-vendor Integration Protocol (MVIP), or Signal Computing System Architecture (SCSA).

One acknowledged limitation on such systems is that they are rather restricted in terms of the number of calls which they can handle; typically 512 ports on a single machine, or 768 ports by interconnecting multiple PCs using a multi-chassis bus. One possibility is to use an SCxbus plus appropriate adapters to connect SCSA systems together (see for example the SCxbus adapter cards available from Dialogic Corporation, advertised at http:://www.dialogic.com/products/d_sheets/2335WEB.htm), but such a solution is still limited in terms of overall capacity and also flexibility.

It is also briefly suggested in the above-mentioned article from Byte magazine that the size limitation can be overcome by using asynchronous transfer mode (ATM) technology, although no details are provided. It seems likely that this suggestion either implies replacing the TDM bus altogether with an ATM link (which would allow a very flexible use of hardware, but would not be compatible with currently available systems), or else using ATM links between machines to effectively increase the length of the TDM bus (ie as a direct replacement for a multi-chassis TDM bus).

An example of a computer-telephony system using ATM is described in "Spawn of NT and ATM: The Un-PBX" by Ed Margulies in Computer Telephony, November 1996, pages 72–84. Here there is a direct ATM link between the desktop and an ATM server, which in turn is connected via a telephony bus to a line interface card, FAX card, etc. This use of ATM allows integration of desktop voice and data services.

Whilst the prior art does offer a wide range of telephony systems and enhanced services, the demand for such services continues to increase, and new services are also being developed. The prior art does not provide a fully flexible architecture, which can be easily extended to provide a very large call handling capacity that can support such enhanced services.

SUMMARY OF THE INVENTION

Accordingly, the invention provides a distributed voice processing system comprising at least first and second systems connected by an isochronous network, said first system including:
- a plurality of telephony interface ports connected to respective telephony channels;
- a first time division multiplex (TDM) bus attached to said plurality of telephony interface ports; and
- a first interface adapter attaching said first time division multiplex bus to said isochronous network;

said second system including:
- a second time division multiplex bus;
- a second interface adapter attaching said second time division multiplex bus to said isochronous network; and
- an application processor unit which can access data on said second time division multiplex bus.

In such a system, calls which arrive at the first system can be handled in a distributed manner, by using the telephony port at the first system and the application processor unit at the second system, with any necessary telephony data being passed between the systems over the isochronous network. This facility avoids having to initially direct calls to a particular system (typically a voice processing unit), and so obviates the need for a telephony switch interface to the telephone network. Instead, the isochronous network is used, effectively behind the systems, to route telephony data between the different systems of the distributed voice processing system. This is much cheaper than using a conventional telephone switch, because standard data connections can be used, rather than expensive telephony switching and interface equipment. Moreover, the switching complexity can be reduced dependent on the number of systems, rather than the number of telephony ports. The application processor unit typically comprises a voice resource under the control of an application program.

In the preferred embodiment, said isochronous network is an ATM network, although other suitable networks such as isoEthernet might also be used. In the currently preferred embodiment, the ATM network is configured to provide permanent virtual circuits between said at least first and second systems, to avoid the need to have to specifically switch each call (instead, calls can simply be routed onto an existing virtual circuit). One advantage of ATM is that it is not restricted in terms of the bandwidth allocated to any single call; in other words, in principle video calls could also be supported for example, although this will depend on the capabilities of the TDM bus.

The first and second interface adapters selectively couple a timeslot on the first TDM bus to a timeslot on the second TDM bus via said isochronous network. In other words, only selected channels from the first TDM bus appear on the second TDM bus. This is important in maintaining complete flexibility in call handling, and in maximising the call handling capacity of the system (which would otherwise be constrained by the capacity of the TDM bus).

The invention further provides a method of processing a call in a distributed voice processing system comprising at least first and second systems connected by an isochronous network, said call being handled by a telephony interface port at said first system, said method including the steps of:
- determining that the call should be handled by an application processor unit on said second system;
- establishing a connection between said telephony interface port on said first system and said application processor unit on said second system via said isochronous network;
- receiving telephony input and/or transmitting a telephony signal over said connection at/from said application processor unit to handle said call.

In the preferred embodiment, said first and second systems each include a TDM bus, and said connection includes a telephony signal route from the telephony interface port at the first machine onto the TDM bus at the first machine, over said isochronous network, onto the TDM bus at said second system, and from there to said application processor unit. Said first and second systems each include an adapter card for transferring data between the TDM bus on that system and the isochronous network.

It is also preferred that said step of determining comprises:
- sending a request to a call manager;
- receiving a response from the call manager indicating that the call should be handled by an application processor unit on a specified system;
- and the Call Manager sending an instruction to the specified system indicating that it is to handle the call.

In some applications the method may also include the application processor unit, in handling the call, accessing a database via the isochronous network. Thus the use of a network such as ATM which supports both voice and data communications leads to a very flexible and powerful architecture, yet one which is relatively simple (ie there is no need to support one network for voice communications, and a separate network for data communications for remote database access).

The invention further provides a method of simultaneously processing first and second calls in a distributed voice processing system comprising at least first, second, and third systems connected by an isochronous network, said first and second calls being handled by first and second telephony interface ports respectively at said first system, said method including the steps of:
- determining that the first call should be handled by an application processor unit on said second system, and the second call should be handled by an application processor unit on said third system;
- establishing a first connection between said first telephony interface port on said first system and said application processor unit on said second system via said isochronous network;
- establishing a second connection between said second telephony interface port on said first system and said application processor unit on said third system via said isochronous network;
- receiving telephony input and/or transmitting a first telephony signal over said connection at/from said application processor unit on the second system to handle said first call; and
- receiving telephony input and/or transmitting a second telephony signal over said connection at/from said application processor unit on the third system to handle said second call.

The invention further provides a distributed telephony switch comprising at least first and second systems connected by an isochronous network, said first system including:
- a first plurality of telephony interface ports connected to a first plurality of telephony channels;
- a first time division multiplex (TDM) bus attached to said plurality of telephony interface ports; and a first interface adapter attaching said first time division multiplex bus to said isochronous network;

said second system including:
a second time division multiplex bus;
a second interface adapter attaching said second time division multiplex bus to said isochronous network; and
a second plurality of telephony interface ports connected to a second plurality of telephony channels.

Such a distributed switch can be made from relatively standard components, and so fabricated much more cheaply than conventional telephony switches. Moreover, it can be easily scaled to handle large numbers of telephony ports, without significantly adding to hardware or software complexity.

BRIEF DESCRIPTION OF THE DRAWINGS

Preferred embodiments of the invention will now be described in detail by way of example only, with reference to the following drawings.

DETAILED DESCRIPTION

Figure 1:
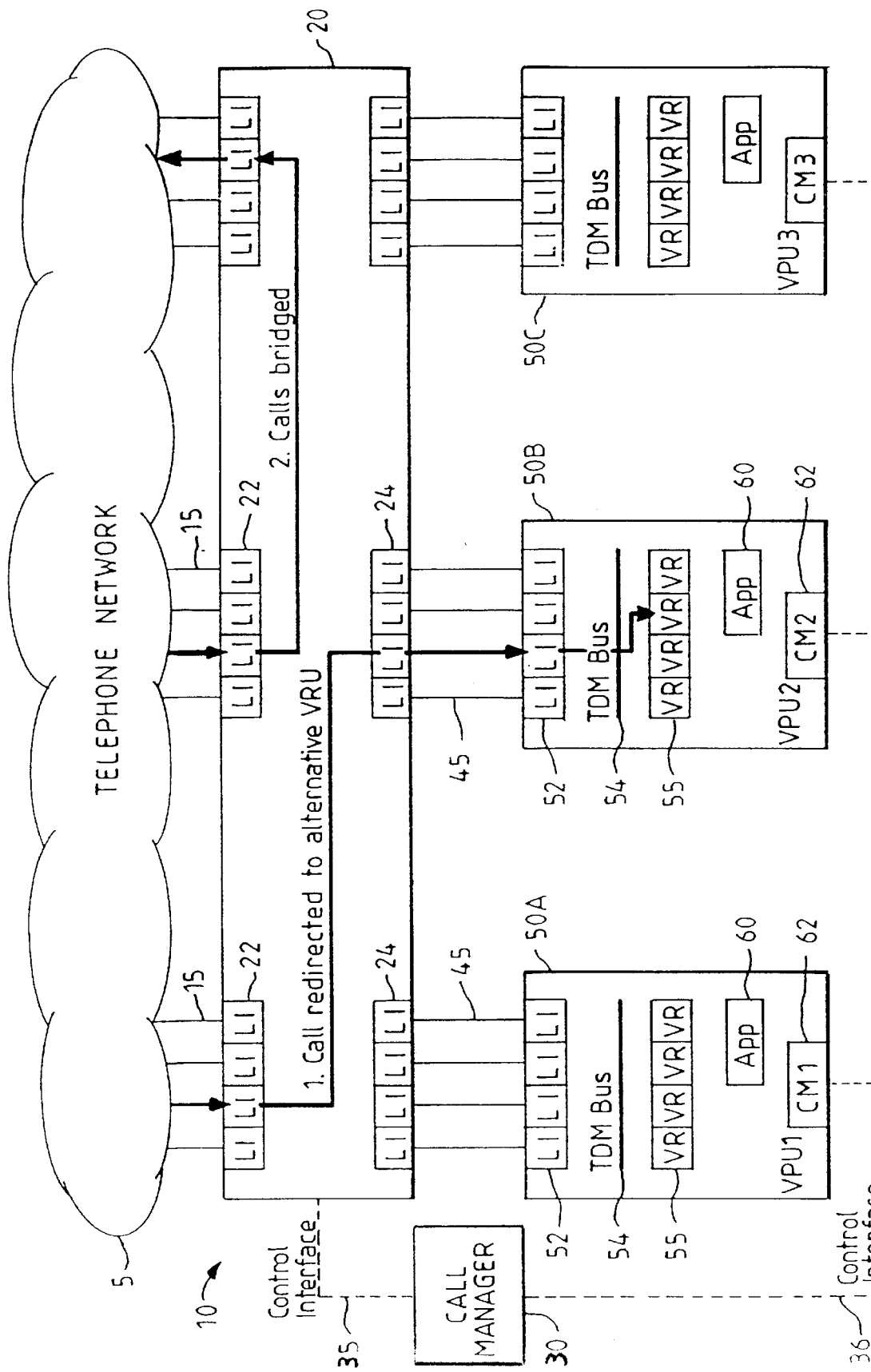
FIG. 1 is a prior art service node.
Figure 2:
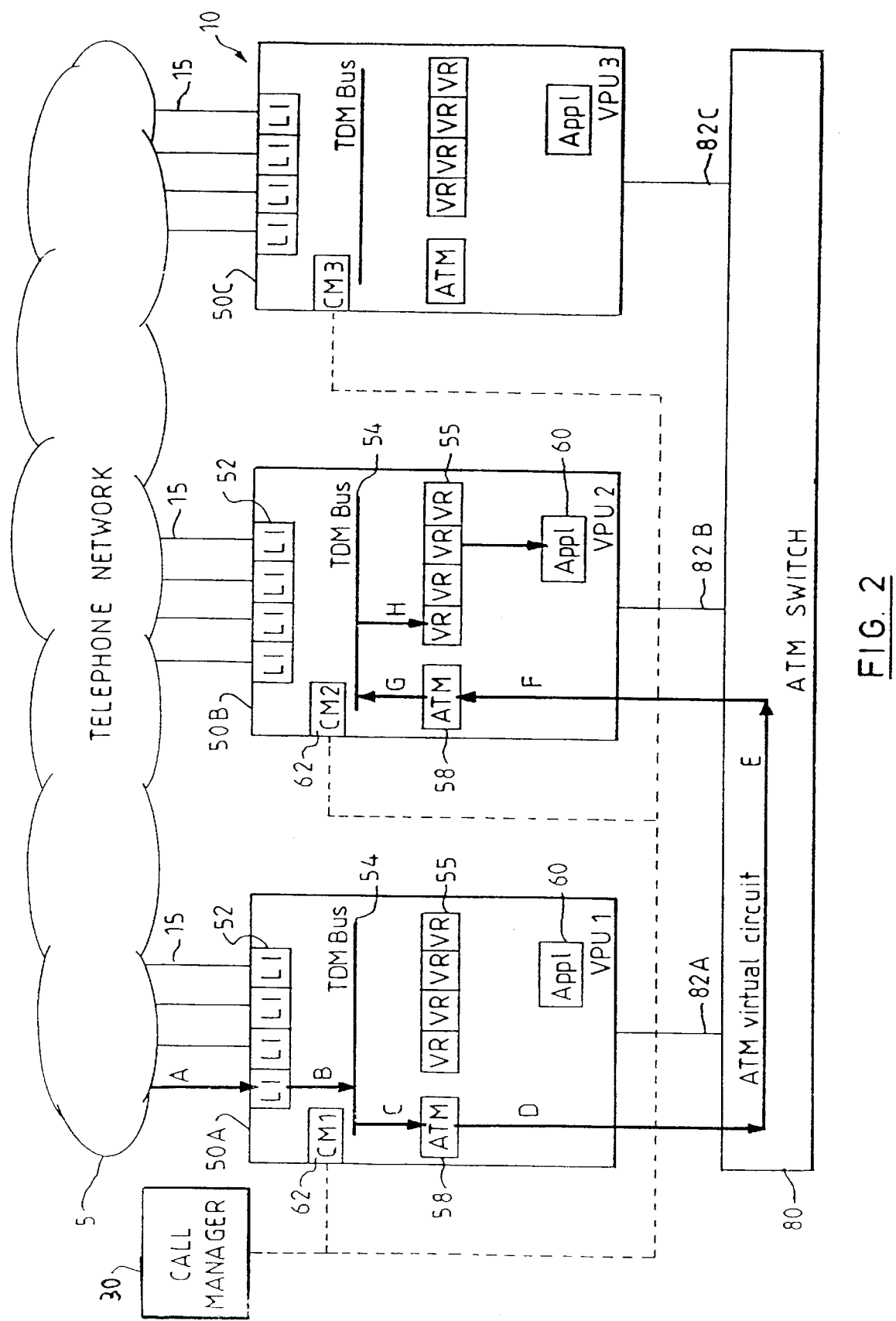
FIG. 2 illustrates a service node in accordance with the present invention, being used for receiving a call at one voice processing system, and handling it with an application at another voice processing system.

FIG. 2 describes a Service Node 10 which performs the same overall function as the Service Node 10 of FIG. 1, but whose internal structure has been modified in accordance with the present invention. Thus in the embodiment of FIG. 2, the multiple voice processing units 50A, 50B are connected directly to the telephone network 5 by multiple telephony channels 15, typically in the form again of T1 digital trunk lines. The embodiment of FIG. 2 does not use a telephony switch, but rather employs an ATM switch 80, effectively behind the voice processing units, to route calls inbetween the voice processing units. The ATM switch is connected to each voice processing unit by a standard ATM connection, such as a 25 Mbps link 82A, 82B (which will support more than 300 voice circuits). Overall routing control in the Service Node is still provided by the Call Manager 30, but this is now more distributed across the voice processing units 50, with some of the functionality provided by call manager components CM1, CM2, 62 etc. AS for the system of FIG. 1, these Call Manager components typically communicate with the main Call Manager 30 in any suitable manner (eg using TCP/IP sockets, remote procedure calls, or distributed object technology such as CORBA). In the preferred embodiment this is provided by a separate local area network (LAN) 36, but alternatively ATM links through ATM switch 80 could be used instead.

Describing now the structure of voice processing unit 50 in more detail, a typical unit includes one or more line interface units 52, the Call Manager component 62, a TDM bus 54, voice resources 55, one or more applications 60, and an ATM adapter card 58. Taking as an example a voice processing unit providing conventional voice response unit (VRU) functionality, then the voice resources are responsible for eg prompt playback or voice recognition, whilst the application determines the particular prompt sequence, or recognition vocabulary.

As in FIG. 1, a line interface unit 52 terminates a respective incoming T1 digital trunk line comprising multiple telephony channels. For incoming telephony signals, the line interface unit extracts the telephony signal from each telephony channel in the trunk, and puts the telephony signal from each telephony channel onto a separate time slot on the TDM bus. For outgoing telephony signals, the line interface unit performs the reverse process. It extracts the desired signal from a particular time slot on the TDM bus, and then multiplexes it onto an appropriate channel on the digital trunk line.

The voice resources 55 are capable of extracting an incoming telephony signal for any particular time slot off the TDM bus, and likewise putting an outgoing telephony signal into an appropriate time slot on the TDM bus. The voice resources may either run on the host processor of the voice processing unit, or on special-purpose hardware included within the voice processing unit, such as a FAX board or a speech recognition card, as is well-known in the art (in some cases, the voice resources may even be provided by a remote server machine, as described in U.S. Pat. No. 5,471,521). The ATM adapter card 58 is likewise capable of extracting a telephony signal off any particular slot on the TDM bus, and inserting a telephony signal into any particular slot on the TDM bus.

It will be appreciated that the hardware components of voice processing system 50 are already known in the art, and are described for example in the above-mentioned. articles "The Surging CTI Tide" by Bob Emmerson and David Greetham, in Byte magazine, November 1996 and "Spawn of NT and ATM: The Un-PBX" by Ed Margulies in Computer Telephony, November 1996, pages 72–84. In particular, line interface cards and TDM buses are very well-known in the art; the TDM buses generally conforming to one of two different standards, either Multi-Vendor Integration Protocol (MVIP) or Signal Computing Architecture (SCSA). Also well-known in the art are various voice resource cards which attach to the TDM bus and provide voice processing functions such as playing a voice prompt, voice recognition or text to speech. The only somewhat less commonplace component of the voice processing system 50 is the ATM adapter card 58, which is used to interface the TDM bus 54 to the ATM network provided by the ATM links 82 and ATM switch 80. A suitable card for performing this function is the Artemis card, available from InnoMedia-Logic (IML), of Quebec, Canada (nb these cards are mentioned in the above-referenced Computer Telephony article). The Artemis cards are described in more detail in "ArTemis Application Notes" from IML Inc, version 1.0, March 1996, which is incorporated herein by reference.

Having described the hardware components of the Service Node 10, its manner of operation will now be described, firstly at a high level, and again with reference to FIG. 2. Thus an incoming call (indicated by arrow A) arrives at the Service Node 10 over a particular telephony channel 15 from the telephony network 5. Typically Service Node 10 will be represented as a whole by a single telephone number, or a set of numbers, in which case the allocation of the incoming call to a telephony channel 15 will essentially be determined by the telephone network 5. However, in some situations it may be preferable to assign particular telephone numbers to particular voice processing units (eg those having the resources best suited to handling a particular type of call), in which case the channel allocation will be dependent, at least in part, on the dialled number.

Assuming that the call is received at a line interface unit 52 belonging to VPU1, this unit extracts the telephony signal and puts the signal (indicated by arrow B) into an appropriate slot on the TDM bus 54. Assuming further that the call is to be handled by a voice processing application on VPU2, the telephony signal is then extracted off the TDM bus 54 on VPU1 and onto the ATM adapter card 58 (indicated by arrow C), and then transmitted on a virtual ATM circuit via ATM link 82A from the ATM adapter card to the ATM switch 80 (indicated by arrow D). The telephony signal is then routed through the ATM switch 80 (indicated by arrow E) and out over ATM link 82B (indicated by arrow F) to the ATM adapter card 58 on VPU2, from where it is inserted into a time slot on the TDM bus 54 on VPU2 (indicated by arrow G). At this stage the call can be taken off the TDM bus (indicated by arrow H) in known fashion by the appropriate voice resource 55 under the control of application 60, and handled accordingly.

It will be appreciated that if, in handling the call, the voice processing application generates an outgoing telephony signal, this follows essentially the reverse path back to telephony channel 15. In other words, the voice resource 55 puts the outgoing telephony signal onto the TDM bus on VPU2, from where it is extracted by the ATM adapter on VPU2, and routed back to the ATM adapter on VPU1 via the ATM switch. The ATM adapter on VPU1 then places the outgoing telephony signal onto the TDM bus, from where it is extracted by the relevant line interface unit 52 for forwarding out over the appropriate telephony channel 15.

An important aspect of the system of FIG. 2 is that the line interface units and voice resources can be independently attached to streams on the TDM bus. In other words, a particular stream is not necessarily assigned automatically to a fixed line interface unit and voice resource. This allows the telephony signal from a line interface unit to be extracted off the TDM bus and transmitted to a separate machine, and then extracted off the TDM bus at this other machine by the appropriate voice resource. Similarly, a voice resource can insert a telephony signal onto the TDM bus, without the requirement that this is directed to a particular line interface unit. With this proviso, the line interface units and voice resources can simply insert a telephony signal onto and extract a telephony signal from the TDM bus without needing to be aware that this telephony signal originates from, or is being transmitted to, another voice processing unit.

Since the LI units are not hard-wired through the TDM bus to the voice resources, care must be taken to control access to the TDM bus, so that for example one LI unit does not write to a timeslot on top of another, and so on. This is achieved in the preferred implementation by the distributed call manager components CM1, CM2, etc effectively controlling access to the TDM bus. Thus whenever a LI unit, voice resource, or the ATM adapter wants to place a telephony signal onto the TDM bus, it first asks (or is instructed by) the call manager component as to the appropriate time slot to be used on the TDM bus. In order to support these allocations, the distributed call manager components maintain a record of which timeslots are available at any given time on the TDM bus.

Figure 3:
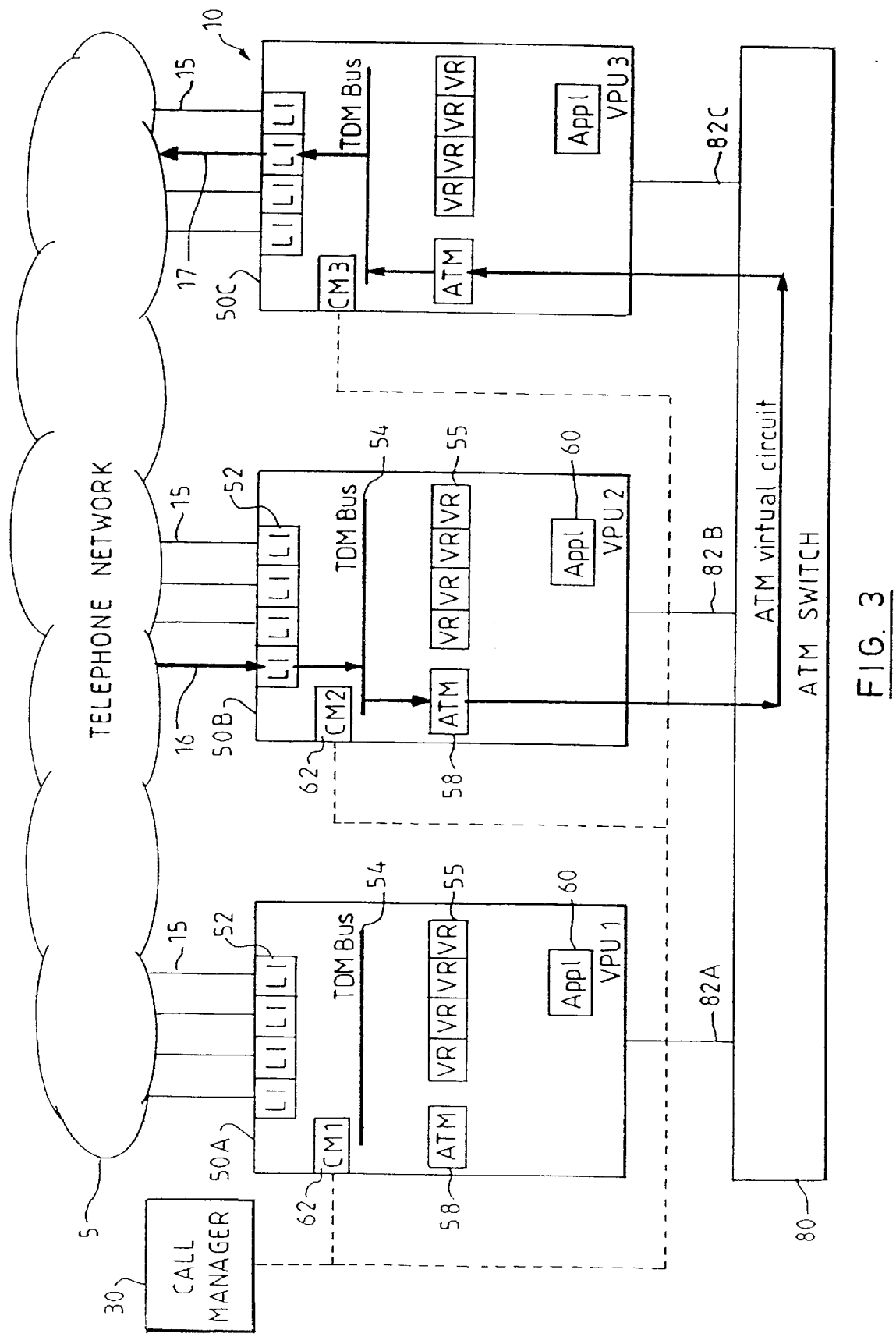
FIG. 3 illustrates a service node in accordance with the present invention, being used for receiving a call at one voice processing system, and bridging the call across to another voice processing system.

FIG. 3 illustrates another function of the Service Node, this time to provide call bridging. A telephony signal is received from telephony channel 16 at VPU2, and transferred via ATM switch 80 and the two ATM adapter cards onto the TDM bus on VPU3. The processing thus far is essentially analogous to that depicted in FIG. 2.

However, unlike in FIG. 2, the telephony signal is extracted from the TDM bus not by a voice resource, but rather by a line interface unit, which then directs the telephony signal out over the desired telephony channel 17. It will be appreciated that the path shown in FIG. 3 can be easily reversed, to allow a telephony signal received over channel 17 at VPU3 to be transferred to VPU2 and transmitted out over VPU2; of course telephone calls are generally duplex so both the path shown in FIG. 3 and its reverse will normally be performed (potentially simultaneously) for the same call. It will further be appreciated that a typical Service Node will be able to support both the transferred call handling shown in FIG. 2, and the call bridging shown in FIG. 3.

Returning to the operation of the call processing function illustrated in FIG. 2, this will now be described in more detail. Thus initially a call arrives at a line interface unit 52 of VPU 1 as shown in FIG. 2. The LI unit has a call control API which is monitored by the distributed call manager component CM1. This call control API alerts the distributed call manager of the arrival of the call, and provides any other available information from the network, for example ANI/DNIS information, dependent on the signalling capabilities of the network. It will be appreciated that this call control API is a conventional part of line interface units, since for standalone VPUs this API is used to notify the VPU application of the arrival of the call, and to pass it available information about the call.

In response to the arrival of the call, the distributed call manager component CM1 assigns the incoming call an identifier (which is used in subsequent processing by the different components of the service node to reference this particular call), and sends a message to the centralised call manager (CM) 30, notifying it that a call has arrived. The message also includes any other available information, such as ANI/DNIS information. The centralised call manager then determines which VPU should be assigned to handle the call. As in the prior art, this decision can be based on a variety of factors, for example even load distribution across the VPUs 50, or the availability of either particular hardware resources or caller specific information (such as a subscriber's voice message database) at a particular VPU, etc. This selection process is well-known in the prior art, and so will not be described in further detail.

Once the centralised call manager 30 has made its routing decision, it responds accordingly to the distributed call manager component from which the call notification was received. For the example shown in FIG. 2 therefore, the call arrives at VPU 1, but the centralised call manager determines that it should be processed by a voice resource on VPU 2. In response to this notification, the distributed call manager component CM1 chooses a virtual circuit between VPU 1 and VPU 2. This may already be allocated (ie permanent), or may be allocated on demand (ie switched); the difference between switched and permanent virtual circuits will be discussed in more detail below. The distributed call manager component CM1 then instructs the line interface unit to place the call on a specified time slot on the TDM bus, and makes an API call to the ATM adapter card 58 in VPU 1 to map this time slot used by the line interface unit for the call onto the ATM virtual circuit. In terms of the above-mentioned Artemis application notes, this corresponds to opening a virtual circuit in transmission.

The distributed call manager then sends the centralised call manager a message indicating that the call is now available on a specified ATM virtual circuit, and the centralised call manager passes this message onto the distributed call manager at VPU 2 (it will be appreciated that it would also be possible to send this message direct from CM1 to CM2). Included within this message can also be information concerning the call, such as ANI/DNIS information.

On receipt of this message, CM2 makes an API call to the ATM adapter in VPU 2, to map the specified ATM virtual circuit onto a selected TDM bus timeslot. In terms of the above-mentioned Artemis application notes, this corresponds to opening a virtual circuit in reception. At this point, further processing is somewhat dependent on the application environment, but in one embodiment CM2 allocates a particular voice resource 55 to process the call, informing the voice resource of the TDM bus timeslot on which the call is available. CM2 then initiates an application 60, which will process the call in conjunction with the voice resource. CM2 informs the application of the allocated voice resource 55, to which the application should connect, together with any other pertinent information (such as any available ANI/DNIS information). Alternatively, CM2 may simply initiate an application 60 to process the call, informing it of the TDM bus timeslot on which the call is available, and leave the application to then attach a suitable voice resource 55 to the selected TDM bus timeslot.

In any event, once the application and voice resource are ready, they return a message notifying this to CM2, which in turn passes the message to the central call manager, to allow it to confirm that the call is being properly processed (eg there is no need for the central call manager to try to assign a different voice processing unit to the call). The centralised call manager then instructs CM1 to answer the call, which it does by making an API call to the line interface unit on VPU 1 to provide the requisite signalling to answer the call back to telephone network 5 (it will be appreciated that up until this point the caller into service node 10 would simply be hearing a ringing tone). The end result is therefore that an application 60 and voice resource 55 on VPU 2 are being used to process a call which arrived at VPU 1, and which is still connected to the telephone network via a line interface unit on VPU 1.

It will be appreciated that at the end of such a call, corresponding communications between the centralised call manager and the call manager components will also be required, to ensure proper tear-down of the call, so that the line interface unit on VPU 1 and the voice resource on VPU 2 are properly freed up and made available for processing of further calls.

As previously indicated with respect to FIG. 3, a service node 10 in accordance with the present invention can also be used to provide call bridging, the operation of which will now be described in detail.

The initial steps of call bridging are analogous to those for processing a call on a remote VRU as illustrated in FIG. 2, except that the call manager selects an appropriate outgoing line interface unit 52, rather than a remote voice resource 55. Thus it is assumed that a call has been received on VPU 2, where it is currently being handled by a voice resource 55 and an associated application 60, and that the application now needs to make an outgoing call, for example because the caller has asked to place a charge-card call. This results in a call request for the desired number being passed from the application to CM2, which in turn sends a request, including the desired number and a call identifier, to the centralised call manager 30. A decision is then made by the centralised call manager as to which VPU should be used to handle the outgoing call, based on current load distribution, or any other appropriate factor (for example, it may be that VPU 2 has no free telephony channels currently available).

In the present situation, it is assumed that the centralised call manager determines that the call should be processed on VPU 3, and so sends a message to CM3 instructing it to establish the desired outbound call. CM3 does this by making an API call to the relevant line interface unit on VPU 3 to perform the signalling necessary to set up the call. Assuming that the call is then dialled by the line interface unit, and (optionally) answered by the called party, CM3 receives an indication of this, and reports this successful completion back to the centralised call manager 30. CM3 also informs the centralised call manager of the LI unit which is connected to the outbound call (another possibility is that the centralised call manager might initially specify the relevant line interface unit on VPU 3 to handle the call, at the same time as making the selection of VPU 3 to handle the call).

The centralised call manager then sends a message to CM2 to indicate that the requested outdial has been completed. Again this message could be sent direct from CM3 to CM2, but routing through the centralised call manager makes it easier for the centralised call manager to monitor current activity on the different VPUs. CM2 then passes this information back to the application which initially requested the outgoing call, informing it that the call has been successfully placed. The application 60 now asks that the incoming and outgoing calls be bridged together, resulting in a request being passed to CM2, which then forwards it to the centralised call manager 30. In response to this request, the centralised call manager sends a message to CM2, instructing it to establish an ATM virtual circuit between VPU 2 and VPU 3, and to map the timeslot of the incoming call onto this virtual circuit. CM2 performs this by the requisite calls to the ATM adapter 58 and to the application/voice resource, and reports success to the centralised call manager, also identifying the virtual circuit used. The centralised call manager then sends a message to CM3 requesting that it attach the timeslot of the line interface unit used for the outdial to the virtual circuit established by CM2, which again is performed by making the requisite calls to the ATM adapter 58 and to the relevant line interface unit on VPU 3. This results in bridging of the incoming and outgoing calls as desired.

It will be appreciated that if the outgoing telephony channel in FIG. 3 is in fact connected to an internal extension, then the service node is effectively functioning as a private branch exchange (PBX) or switch, which can be used to link outgoing trunk lines to internal extensions and vice versa (plus internal extension to internal extension, and so on), provided of course that suitable switching software is used. In this case the voice resources 55 and applications 60 on the VPUs may be minimal, or even non-existent, with the VPUs simply having the LI units, TDM bus, ATM adapter card, and distributed call manager components. The cost of developing such a system is significantly cheaper than the price of a conventional switch, since most of the components are standard workstations or adapter cards, typically priced $1–10 k. This is to be contrasted with the $50–100 k standard cost of a basic switch.

The preferred embodiment therefore provides a service node 10 having multiple voice processing units linked together via an ATM switch 80. ATM is connection-oriented, with connections (virtual circuits) established for the duration of a call. The currently preferred embodiment uses permanent virtual circuits (PVCs), which are set up when the service node is initially configured or subsequently re-configured, to route calls between the different VPUs. The alternative is to use switched virtual circuits (SVCs). The use of PVCs is is simpler, since there is no need for the ATM adapter card to perform any signalling and there is no real-time switching of virtual circuits between different nodes. Thus the above-mentioned Artemis ATM adapter cards currently only support such PVCs (by contrast, SVCs require support of the Q.2931 signalling protocol between. the adapter and the switch).

The use of PVCs to statically allocate switch bandwidth, rather than a dynamic allocation based on SVCs, admittedly does not fully optimise available bandwidth through the switch. However, the effect of this is likely to be minimal, given the low number of VPUs that will normally be attached to the switch, compared to the overall number of telephony channels. Furthermore, the use of PVCs also helps to minimise the cost of service node 10, since the ATM switch can be very simple.

For example, the configuration shown in FIGS. 2 and 3 requires only 3 different (duplex) virtual paths to link VPU 1, VPU 2, and VPU 3. Thus the support of PVCs rather than SVCs greatly reduces overall system complexity.

An example of a suitable ATM switch is the 8285 NWays ATM workgroup switch available from IBM Corporation, which has an entry system which will support 12 voice units (ie well over 1000 telephony channels) for around $5000, compared to the entry price for a traditional telephony programmable switch of $50–100 k. Moreover, in theory the 8285 switch can be scaled up to 30,000 channels (although some other limitations may prevent full use of this capacity). By contrast, traditional telephony switches are typically constrained to about 1000 channels, and require additional units to go beyond this limit, significantly adding to software complexity.

Another important aspect of the ATM network in FIGS. 2 and 3 is its ability to provide an isochronous communication between the VPUs, despite being a packet-switched network. In other words, the transmission time of a packet (or cell) through the ATM network is tightly constrained (ie jitter is minimised), so that at the receiving end the telephony signal can be directly reconstructed from the incoming cells without imposing significant buffering requirements, which would result in end-to-end delays. As a consequence of this, the ATM connection between the TDM buses on different machines is effectively transparent to the line interface units and voice resources, so that for example if a line interface unit is taking telephony data off the TDM bus at VPU 1, it does not necessarily know whether that telephony data was placed directly on the TDM bus from a voice resource at VPU 1, or from a remote voice resource at VPU 2 or VPU 3, via the ATM network. This transparency is important in allowing the present invention to be used with currently available line interface units and voice resources.

As shown in FIGS. 2 and 3, an important feature of the invention is that the line interface units 52 are no longer tightly coupled to particular voice resources 55, but rather the voice resources can be allocated to different line interface units. One consequence of this is that it potentially allows an application to attach two voice resources to the same telephony channel. For example, an application may simultaneously use a first voice resource to perform voice recognition in one language, and a second voice resource to perform voice recognition in another language, for situations where the caller is likely to be bilingual, and his or her language of response cannot be predicted. In such a situation, both voice resources extract the same timeslot from the TDM bus (although of course the first and second voice resources need not be on the same machine, if an application is enabled to remotely control a voice resource).

Figure 4:
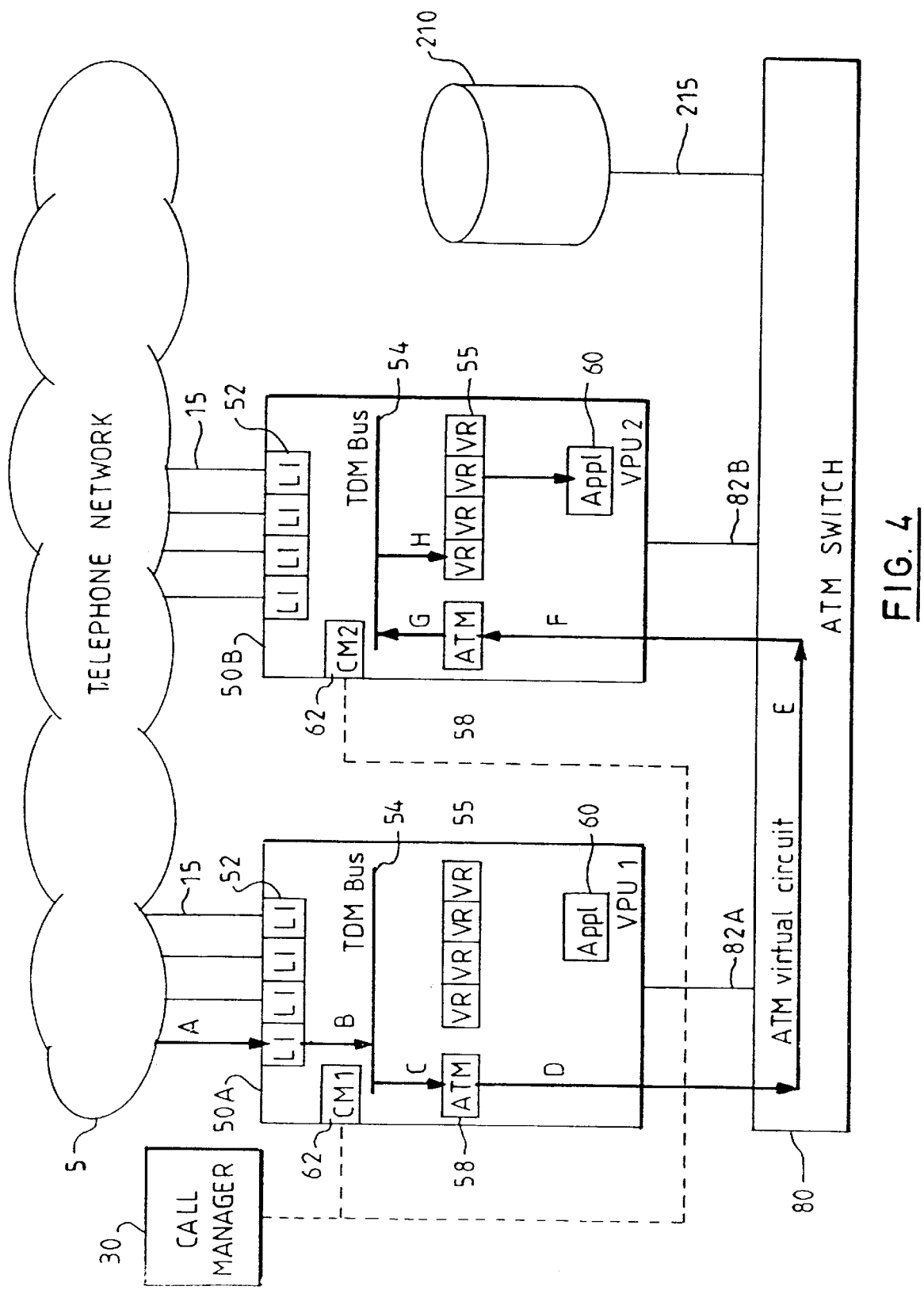
FIG. 4 illustrates a service node in accordance with the present invention, which provides database access for the voice processing systems.

FIG. 4 illustrates another implementation of the Service Node, in which VPU3 has been replaced by database system 210 (although this should not be taken as implying any limit on the number of voice processing systems in such a configuration). The database system 210 typically resides on a computer, such as an AS/400 computer or RS/6000 workstation, both available from IBM Corporation. The database system 210 is linked to the ATM switch 80 and ATM network via ATM link 215, to provide remote access to the database as is well-known in the art. This allows applications 60 on the voice processing systems to effectively provide their callers with dial-up access to the database 210 (eg perhaps for checking a bank balance).

Thus as shown in FIG. 4, as part of its call handling procedure, application 60 performs a remote data access to database 210, via ATM adapter 58 and ATM switch 80. In particular, application 60 sends a communication request directly to the ATM adapter card 58 and associated software. In order to support ATM communications, an ATM adaption layer (AAL) is required; for real-time voice ATM communications, so-called AAL1 is required, whilst for ATM data communications, so-called AAL5 is required. At present the above-mentioned Artemis card provides only AAL1 (voice), but IML have announced that a new card (Artemux) will be available shortly that will include support for both voice and data (see http://www.iml-cti.com/Products.htm).

The arrangement shown in FIG. 4 has the significant advantage that the same hardware connection can be used for both voice and data communications with the voice processing units, thereby providing a significant saving in overall system complexity and cost.

It will be appreciated that whilst database 210 is shown as directly linked to the ATM switch 80, instead the database could be remotely attached to the ATM network. For example, there could be an Internet gateway connected to switch 80, allowing the voice processing units 50 to access any database attached to the Internet, via ATM switch 80 and the Internet gateway.

In the preferred embodiment, each voice processing unit supports a voice application environment (VAE) (not shown), which effectively sits between the line interface unit 52 and the application 60. To simplify the description hitherto, the VAE functionality has effectively been subsumed into the operation of the distributed call manager components CM1, CM2, but an indication of its particular purpose will now be given. Thus in stand-alone operation of the VPU, the VAE isolates the application from the line interface unit, so that the application does not need to know details of the line interface and line signalling. The VAE can also be used as an intermediary between the distributed call manager components and the application. This latter role is extended in the preferred embodiment of the invention, to ensure that the application does not need to be aware that it may be interacting with a line interface unit on a remote VPU.

For example, in the call bridging example described above, when the application on VPU 2 requests an outgoing call, this request is passed to the VAE, which in standalone operation would then forward the request to the line interface unit. However, in accordance with the present invention, the VAE is modified so that this request is instead passed to CM2, and from there to the centralised call manager. Similarly, when the outdial is successfully completed, the acknowledgement of this is fed back from CM2 to the application via the VAE. It will be seen that in this manner, the existence of multiple voice processing units is shielded from applications, which accordingly do not necessarily need to be modified for use in the service node 10 of FIGS. 2 and 3.

Although FIGS. 2 to 4 illustrate three potential uses of the service node 10, it will be recognised that there are many more such potential uses, some of which may involve more complicated processing and redirection of telephony data. This may arise perhaps where a single call requires a variety of different services. For example, starting with the situation shown in FIG. 2, it may be that a caller initially interacts with a voice resource on VPU 2 that provides voice response functionality, which leads to a determination that the user requires some particular information (perhaps about the weather at a particular location, or perhaps a telephone number). In this case the application 60 on VPU 2 might then request, via the VAE and CM2, for the call to be transferred to VPU 3 (for example), which might have voice resources dedicated to text to speech. This then leads to a termination of the call connection on VPU 2, and instead a transfer to an appropriate voice resource and application on VPU 3. This is achieved by the Call Manager setting up a new virtual circuit for the call, directly from VPU 1 to VPU 3, thereby freeing up the resource on VPU 2. (An alternative approach would be for the voice resource on VPU 3 to be used effectively as a remote server under the control of the application on VPU 2, as described in the above-mentioned U.S. Pat. No. 5,471,521).

One of the significant benefits of the invention arises from effectively placing the switch behind the VPUs as shown in FIGS. 2 to 4, thereby obviating the need for a specialised telephony connection between the switch and the VPUS (trunk lines 45 in FIG. 1), and significantly reducing the number of line interface units required (line interface units 22 and 24 in FIG. 1 are no longer needed). This leads to a considerable cost reduction, because such specialised telephony connections and line interface units are expensive, due to their complexity, low volume production and development expense.

Instead, the preferred embodiment utilises an ATM network to route the telephony channels. This offers the following advantages: it is fast and able to provide a high bandwidth to support multiple channels of voice data, (typically 8 k bytes/second per active channel in each direction); the voice data flow is isochronous, i.e. with a minimal time delay and able to sustain a continuous data rate from the voice channel; traffic can be carried in both directions simultaneously; control information can be carried as well as voice data (although the preferred embodiment routes most of the control information separately on the LAN); and multiple VRU devices can be connected to each other, enabling eg load balancing and redundancy.

Note that whilst the use of multiple VRU devices does provide some redundancy, to provide full redundancy, the Call Manager and ATM switch should be duplicated, and each VRU should be connected to both Call Managers and both ATM switches. This will generally require two ATM adapter cards in each voice processing system (it is in fact this aspect which is most significant from a cost point of view).

Figure 5:
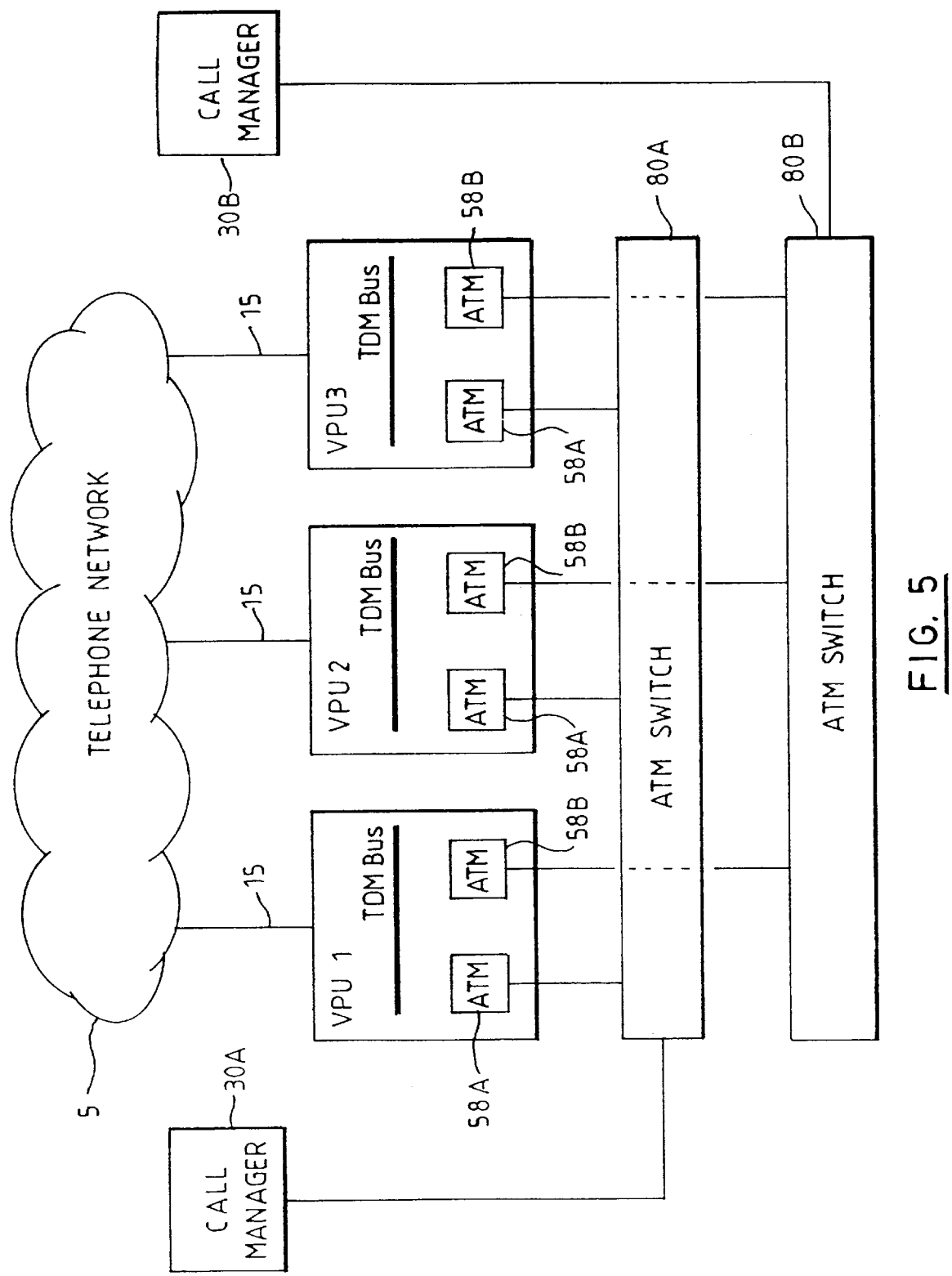
FIG. 5 illustrates a service node in accordance with the present invention, having a full redundancy capability.

A service node with full redundancy capability is illustrated in FIG. 5 (in which for simplicity some of the detail of each voice processing unit 50 is omitted). The system of FIG. 5 effectively includes two parallel ATM networks, each having its own ATM switch 80A, 80B. Each voice processing unit has two ATM adapter cards, 58A and 58B, which link to ATM switch 80A and 80B respectively. Therefore, even if one of the ATM switches becomes unavailable, the voice processing units can still use the other ATM switch to communicate with one another.

FIG. 5 also illustrates duplicate Call Managers, 80A and 80B, which again are provided to ensure a full redundancy capability, such that the system can still operate, even if one of the Call Managers becomes unavailable. Note that in the embodiment of FIG. 5, the Call Managers communicate with the voice processing units 50 using the ATM network, rather than having a separate communication path as in FIGS. 2 and 3 (the possibility of doing this was mentioned earlier).

It will be appreciated that the system of FIG. 5 will lose a third of its processing capability should one of the voice processing systems 50 become unavailable. If this is potentially a problem, then spare (redundant) voice processing systems can be included in the Service Node to provide a backup capability.

Although the preferred embodiment uses an ATM connection to link the voice processing units, other isochronous networks could be used instead of the ATM network, such as isoEthernet. A suitable TDM bus to IsoEthernet adapter is the SC-ISO card which is commercially available from Quicknet Technologies Inc, of California, USA.

It will be appreciated that many variations on the configuration and processing described above will be apparent to the skilled person. For example in the signalling between the different components of the system, the call manager components CM1, CM2, etc may communicate directly with one another without using the centralised call manager. However, requiring the call manager components to communicate via Call Manager 30 helps the Call Manager to accurately track the current status of each voice processing unit 50. This information can then be used in routing incoming calls to any particular voice processing unit (as a corollary of this, it is also important for the Call Manager to be informed when calls terminate).

As shown in FIG. 5, for some installations it may be desirable to duplicate the Call Manager 30, in order to provide a redundancy capability. Another possible approach would be to remove the centralised Call Manager as a separate element in the call centre, and instead to distribute the call manager functionality across the different call manager components CM1, CM2, etc, at the voice processing systems themselves (again it may be desired to include some redundancy capability in such an arrangement).

It will be recognised that the range of potential voice resources in the service node is very large, including voice response functionality, voice mail, FAX servers and FAX mail, speech recognition and speech synthesis, and so on. Further, although each of the voice processing units 50 in FIGS. 2 and 3 are shown as being substantially the same, there are many situations when this may not be desirable. For example, some VPUs may not have any line interface units at all, perhaps because they are dedicated to high-speed processing such as required for voice recognition or text-to-speech, or because they are equipped with significant storage, such as might be required for voice mail systems. Also, there is no requirement for all the VPUs to use the same bus architecture for their TDM bus. For example, the invention allows a service node to combine an SCSA-based VPU with a MVIP-based VPU; one reason for wanting to do this might be where a desired voice processing resource, such as a particular voice recognition card is only available for a different architecture from that of a desired text to speech card.

What is claimed is:

1. A distributed voice processing system comprising at least first and second systems connected by an isochronous network, said first system including:
a first line adapter card having a plurality of telephony interface ports for connection lo a telephony network separate from said isochronous network, whereby in operation each telephony interface port can be connected to a respective telephony channel in order to exchange telephony signals with the telephony network as part of a telephone call;
a first time division multiplex (TDM) bus presenting multiple timeslots attached to said plurality of telephony interface ports, whereby an incoming telephony signal from a telephony channel associated with a telephony interface port can be transmitted from the port onto a corresponding timeslot on the TDM bus; and
call handling means responsive to an incoming telephony call for providing a determination that the incoming telephony signal associated with said call should be forwarded to the application processor unit on the second system;
a first interface adapter card for attaching said first time division multiplex bus to said isochronous network, whereby responsive to said determination the incoming telephony signal can be passed from said corresponding timeslot on the TDM bus through said first interface adapter card onto said isochronous network;

said second system including:
a second interface adapter card for attachment to said isochronous network to receive said incoming telephony signal passed onto said isochronous network by the first interface adapter card;
a second time division multiplex bus presenting multiple timeslots attached to said second interface adapter card whereby the incoming telephony signal can be received from the second interface adapter card onto a corresponding timeslot on the second TDM bus; and
an application processor unit which can access the incoming telephony signal on said timeslot on said second time division multiplex bus.

2. The distributed voice processing system of claim 1, wherein said isochronous network is an ATM network.

3. The distributed voice processing system of claim 2, wherein said ATM network is configured to provide one or more permanent virtual circuits between said at least first and second systems.

4. The distributed voice processing system of claim 1, further comprising a Call Manager, wherein said call handling means interacts with said Call Manager in order to make said determination that a call at a telephony interface port on said first system is to be connected to said application processor unit at said second system.

5. The distributed voice processing system of claim 4, wherein for incoming calls said determination is dependent on ANI and/or DNIS information supplied to the Call Manager from the telephony interface port where the call is received.

6. The distributed voice processing system of claim 4, wherein said Call Manager and said at least first and second systems are connected by a data network.

7. The distributed voice processing system of claim 1, wherein said application processor unit provides voice response or voice recognition function.

8. The distributed voice processing system of claim 1, wherein said first TDM bus has a different protocol standard from said second TDM bus.

9. A method of processing a call in a distributed voice processing system comprising at least first and second systems connected by an isochronous network, said method including the steps of:

providing in the first system a first line adapter card having a plurality of telephony interface ports connected to a telephony network separate from said isochronous network, thereby permitting the exchange of telephone signals between the first line adapter card and the telephony network as part of a telephone call;
receiving an incoming telephone call from the telephony network at one of said plurality of telephony interface ports;
determining that the call should be handled by an application processor unit on said second system;
linking said telephony interface port on said first system and a timeslot on a time division multiplex (TDM) bus on the first system, whereby telephony input comprising telephone signals received at said one telephony interface port as part of the telephone call can be transferred into said timeslot;
forwarding said telephone signals from said timeslot on the TDM bus on the first system to a timeslot on a TDM bus on the second system via a connection across said isochronous network;
passing the telephone signals from said timeslot on the TDM bus on the second system to said application processor unit on said second system;
thereby receiving telephony input over said connection at said application processor unit to handle said call.

10. The method of claim 9, wherein said first and second systems each include an adapter card for transferring data between the TDM bus on that system and the isochronous network.

11. The method of claim 9, wherein said isochronous network is an ATM network.

12. The method of claim 11, wherein said connection over the ATM network is established using one or more permanent virtual circuits.

13. The method of claim 9, wherein said step of determining comprises:
sending a request to a Call Manager;
receiving a response from the Call Manager indicating that the call should be handled by an application processor unit on a specified system.

14. The method of claim 13, further comprising the step of the Call Manager sending an instruction to the specified system indicating that it is to handle the call.

15. The method of claim 13, wherein said request is sent to the Call Manager for an incoming call when the call initially arrives at the telephony interface port.

16. The method of claim 9, wherein the determination that the call should be handled by an application processor unit on said second system is based on ANI and/or DNIS information related to the call.

17. The method of claim 9, further comprising the step of the application processor unit using said isochronous network to access a database, in order to handle said telephony call.

18. A distributed telephony switch comprising at least first and second systems connected by an isochronous network, said first system including:
- a first line adapter card having a first plurality of telephony interface ports for connection to a telephony network separate from said isochronous network, whereby in operation each telephony interface port can be connected to a corresponding one of said first plurality of telephony channels;
- a first time division multiplex (TDM) bus presenting multiple timeslots attached to said plurality of telephony interface ports, whereby an incoming telephony signal from a telephony channel associated with a telephony interface port can be transmitted from the port onto a corresponding timeslot on the TDM bus;
- call handling means responsive to an incoming telephony call for providing a determination that the incoming telephony signal associated with said call should be forwarded to a telephony interface port on the second system; and
- a first interface adapter card for attaching said first time division multiplex bus to said isochronous network, whereby responsive to said determination the incoming telephony signal can be passed from said corresponding timeslot on the TDM bus through the first interface adapter card onto the isochronous network;

said second system including:
- a second interface adapter card for attachment to said isochronous network to receive said incoming telephony signal passed onto said isochronous network by the first interface adapter card;
- a second time division multiplex bus presenting multiple timeslots attached to said second interface adapter card, whereby the incoming telephony signal can be received from the second interface adapter card onto a corresponding timeslot on the second TDM bus; and
- a second plurality of telephony interface ports connected to a second plurality of telephony channels, whereby the incoming telephony signal can be directed from the timeslot on the second TDM bus out over one of said second plurality of telephony channels through one of said second plurality of telephony interface ports.

19. The distributed telephony switch of claim 18, wherein said isochronous network is an ATM network.

20. The distributed telephony switch of claim 19, wherein said ATM network is configured to provide at least one permanent virtual circuit between said at least first and second systems.

21. The distributed telephony switch of claim 18, further comprising a Call Manager, wherein said call handling means interacts with said Call Manager in order to make said determination that a call at a telephony interface port for one of said first plurality of telephony channels is to be connected to a telephony port for one of said second plurality of telephony channels.

* * * * *